(12) United States Patent
Zimmer

(10) Patent No.: US 6,550,097 B1
(45) Date of Patent: Apr. 22, 2003

(54) WIPER ARM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/763,739

(22) PCT Filed: May 26, 2000

(86) PCT No.: PCT/DE00/01721

§ 371 (c)(1),
(2), (4) Date: Apr. 9, 2001

(87) PCT Pub. No.: WO01/02223

PCT Pub. Date: Jan. 11, 2001

(30) Foreign Application Priority Data

Jun. 29, 1999 (DE) .......................... 199 29 914

(51) Int. Cl.[7] ................................. B60S 1/34
(52) U.S. Cl. .............................. 15/250.34; 15/250.351; 403/90; 403/103; 403/91; 403/97
(58) Field of Search ................. 15/250.34, 250.31, 15/250.351, 250.352; 403/97, 90, 83, 103, 104, 91

(56) References Cited

U.S. PATENT DOCUMENTS 3,085,821 A  4/1963  Ryck ....................... 15/250.34
5,623,742 A  4/1997  Journee ................... 15/250.34

FOREIGN PATENT DOCUMENTS

| DE | 3329146    | * | 2/1985  | ............. 15/250.34 |
| DE | 37 33 237 A1 |   | 4/1989  |                         |
| DE | 4224861    | * | 2/1994  | ............. 15/250.34 |
| DE | 44 28 371 A1 |   | 2/1996  |                         |
| EP | 604324     | * | 6/1994  | ............. 15/250.34 |
| EP | 0 703 129 A |   | 3/1996  |                         |
| WO | 94/22696   | * | 10/1994 | ............. 15/250.34 |

* cited by examiner

Primary Examiner—Gary K. Graham
(74) Attorney, Agent, or Firm—Michael J. Striker

(57) ABSTRACT

A wiper arm for a pivotably connected wiper blade has a fastening part (10) for fastening to a drive shaft (12), by inserting the drive shaft through a widening indentation (38) of the fastening part (10), and a screw nut (44 tenses the fastening part (10) against a bearing face (30) to the drive shaft (12) via a clamping part (40, 50) that is adapted to the indentation (38), and also the contact face (66) between the clamping part (40, 50) and the fastening part (10) forms a part of the surface of a sphere, and the bearing face (30) forms a part of a jacket face of a cylinder, whose cylinder axis (32) extends through the center point (36) of the sphere and parallel to the longitudinal direction (34) of the wiper blade.

21 Claims, 6 Drawing Sheets

WIPER ARM

BACKGROUND OF THE INVENTION

The invention is based on a wiper arm.

Known windshield wipers have a wiper arm, which is constructed from a fastening part and a hinge part, pivotably connected to the fastening part via a foldaway hinge, the hinge part having a wiper rod. A hooklike end of the wiper rod engages a suspension box of a wiper blade, which-is formed by two side walls of a center bracket, and includes a connection part with a hinge bolt. The thus-formed hinge guides the wiper blade over the vehicle window during the pivoting motion.

The wiper blade has what as a rule is a multimember support bracket system, with subordinate brackets which are pivotably connected to the middle bracket and of which at least some, with claws on their ends, retain a wiper strip on its top strip. The multi-member support bracket system and spring rails placed in the top strip make it possible during wiping for the wiper strip to adapt to a curved windshield with a uniform contact pressure. To that end, a tension spring prestresses the foldaway hinge. Such windshield wipers are known for instance from German Patent Disclosure DE 37 44 237 A1. In simplified versions, subordinate brackets, also known as intermediate brackets and claw brackets, can be dispensed with. In the simplest case, the middle bracket itself has claws, with which it retains the wiper strip. The wiper arm, via its fastening part, is joined solidly but releasably to a drive shaft.

The drive shaft protrudes from the vehicle body and on its free shaft end it has an outer cone, which cooperates with an inner cone on the fastening part, in that a screw nut presses the conical parts firmly together. For a good wiping outcome and to avoid wiper chatter, it is important that the wiper strip with its wiper lip is guided at a certain positioning angle over the vehicle window. Although the production tolerances of the numerous individual components of the windshield wiper and of its drive mechanism are slight, still the sum of the tolerances, together with those of the fastening to the vehicle body and the vehicle body itself is so great that an optimal positioning angle is not guaranteed in mass production. While the wiper systems are well oriented crosswise to the vehicle direction, because of their high ratio of length to width, a poor orientation results above all in the longitudinal direction of the vehicle.

From German Patent Disclosure DE 44 28 371 A1, a shaft hub connection of a windshield wiper is known in which the drive shaft, in the connection region, has a cross section that deviates from the circular, in particular a polygonal cross section, and has a shoulder. The fastening part rests with one edge of a recess on the shoulder or on a shim; toward the end of the drive shaft, the recess widens conically. A fitting, conical clamping part is inserted into the recess and is pressed against the fastening part by a screw nut. The km has a passageway for the drive shaft, the cross-sectional profile of the passageway being equivalent to that of the drive shaft.

From U.S. Pat. No. 3,085,821, a shaft hub connection of a windshield wiper is known. The fastening part rests with one edge of a recess on a shoulder of the drive shaft or a shim, and the recess widens conically toward the end of the drive shaft. A fitting, conical clamping part is inserted into the recess and is pressed by a screw nut against the fastening part. The clamping part has a passage for the drive shaft, which passage fits a cylindrical or conical region of the drive shaft with a knurling or zigzag surface. Because of the conical connection between the fastening part and the clamping part and optionally the conical connection between the clamping part and the drive shaft, the zigzag surface of the fastening part and of the drive shaft is pressed into what until then was an extensively smooth surface of the clamping part and permanently deforms it. To that end, the clamping part comprises an elastomeric material or a relatively soft nonferrous metal. Along with a nonpositive engagement, a reinforcing positive engagement is achieved by means of many small side faces of the zigzags.

SUMMARY OF THE INVENTION

According to the invention, the contact face between the clamping part and the fastening part forms a part of the surface of a sphere, while the bearing face forms a part of a jacket face of a cylinder, whose cylinder axis extends through the center point of the sphere and parallel to the longitudinal direction of the wiper blade. As a result, within a small installation space, an infinitely graduated adjustment of the fastening part and thus of the wiper arm about its longitudinal axis is achieved, if the bearing face is smooth. An infinitely graduated adjustment is possible when the bearing face has a fluting that is parallel to the cylinder axis. The fluting, by positive engagement, reinforces the nonpositive connection at the bearing face. The nonpositive engagement can also be reinforced by providing that the bearing face is roughened on at least one of the parts to be connected.

The positioning angle of the wiper blade can thus be selected freely during assembly, so that production variations do not adversely affect it. The position in terms of height of the wiper arm when the setting is done is determined by the longitudinal axis of the cylinder. To assure that the position in terms of height is altered only slightly if at all by the adjustment, it is provided in one feature of the invention that the cylinder axis extends at a slight spacing from the hinge axis of the foldaway hinge, with which the hinge part is pivotably connected to the fastening part, or intersects the hinge axis. An increasing spacing would in fact upon an adjustment be expressed in a greater deviation in height.

The connection between the drive shaft and the fastening part must be secure and must be capable of transmitting high torques. Nevertheless, the connection must not react sensitively to the tightening moment of the screw connection in such a way that the selected setting changes unintentionally when the screw is tightened. It is therefore expedient that the cylinder axis of the bearing face of the fastening part extends through the center point of the sphere of the contact face between the clamping part and the fastening part, with the cylinder axis advantageously being located inside the fastening region of the fastening part.

In one feature of the invention, it is proposed that the setting angle of the fastening part about the cylinder axis of the bearing face is limited by a stop. This prevents the unintended installation of completely useless setting angles on the vehicle. The stops form the optimal positioning angle, from which deviant settings which while not optimal are still usable can be made. In a simple way, the stops are formed by an elongated hole in the fastening part that extends transversely to the cylinder axis and cooperates with the drive shaft.

The cylindrical bearing face can be formed directly onto the drive shaft, but expediently it is formed into a separate support disk, which after installation is braced on a shoulder of the drive shaft. The support disk is guided rotatably on the drive shaft, so that the longitudinal direction of the fastening part and thus the longitudinal direction of the wiper arm can be rotated about the drive shaft axis and oriented, before the torque connection is established by means of the clamping part and the screw fastening. At the same time, the fastening part can be rotated between the two stops about the cylinder axis, in order to set the positioning angle of the wiper blade relative to the vehicle window.

The torque is expediently transmitted from the drive shaft via a nonround profile, preferably one with a polygonal cross section, to the clamping part which in turn transmits it through a predominantly nonpositive engagement via the spherical contact face to the fastening part. As a result, the torque is transmitted along a small circumference by means of a secure positive engagement, while the nonpositive engagement is provided at a greater diameter and can thus transmit greater moments by means of lesser pressing forces. The nonpositive engagement can be reinforced by a positive engagement by providing that the spherical contact face of the fastening part is roughened or fluted. The fluting on the clamping part expediently extends at an angle to the fluting on the fastening part, so that the directions intersect, resulting in a positive engagement that acts both in the direction of the torque to be transmitted and in the direction of the adjusting forces; the flutings can dig partway into one another. Because of the deformability of the fluting, production variations can also be compensated for.

In one feature of the invention, the clamping part on its circumference has longitudinally extending grooves, which end shortly before the larger end face. The grooves cause the clamping part to deform elastically, enabling it to adapt better to the indentation of the fastening part. Since the grooves are not extended as far as the end face of the clamping part but instead end shortly before that, a smooth end face is preserved. The grooves are also protected from the outside. The elastic effect of the grooves can be enhanced by providing that they are provided on a clamping part with a polygonal profile and are disposed opposite the edges of the profile. The grooves are also expediently provided with annular steps, which surround the clamping part and penetrate into a fluting, extending crosswise to it, of the indentation of the fastening part.

In order to obtain a play-free positive-engagement connection between the drive shaft and the clamping part that otherwise is readily releasable, it is provided that the polygonal profile of the drive shaft narrows toward the screw nut.

Before the final installation, some parts of the connection can already be preassembled. For this purpose, on the one hand a plastic securing ring is used, which rotatably fastens the support disk on the drive shaft, and on the other, in a different version, a plastic clip is used, which firmly holds the support disk pivotably about the cylinder axis on the fastening part. Here the fastening part has a collar on which the plastic clip is retained. With protrusions, the plastic clip can also engage recesses of the fastening part.

DRAWING

Further advantages will become apparent from the ensuing description of the drawings. In the drawing, exemplary embodiments of the invention are shown. The drawing, description and claims include numerous characteristics in combination. One skilled in the art will expediently consider the characteristics individually as well and put them together to make useful further combinations.

DESCRIPTION OF THE PREFERRED EMBODIMENTS

Figure 4:
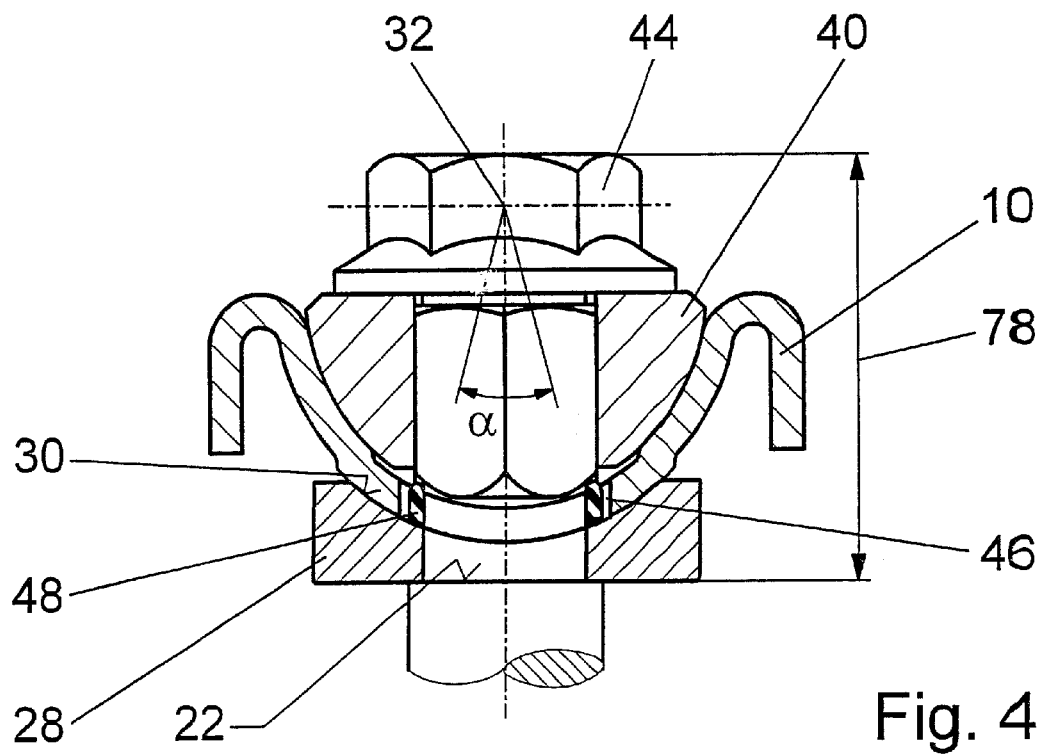
FIG. 4, a section taken along the line IV—IV in FIG. 3.

The drawing shows only part of a wiper system having a wiper arm, to the extent necessary for comprehension of the invention. The wiper arm includes a fastening part 10, which is fastened on a drive shaft 12. The drive shaft 12 is supported in a bearing housing 14, which has a connection stub 16 for a wiper carrier, not shown in detail, and a fastening eyelet 18, with which the bearing housing 14 is fastened to a vehicle body, not shown. The drive shaft 12 is driven by a wiper motor via a lever mechanism and a crank 20, which is solidly connected by one end to the drive shaft 12. The free end of the drive shaft 12 has a shoulder 22 and a profile 24 with a polygonal cross section, as well as an adjoining thread 26. A support disk 28 is threaded onto the free end of the drive shaft 12 and is braced on the shoulder 22 but is guided rotatably about the drive shaft 12. A concave, cylindrical bearing face 30 is formed into the support disk 28 toward the fastening part 10, and a corresponding cylindrical surface 30 of the fastening part 10 rests on it (FIG. 4).

The fastening part 10 has an indentation 38, into which a clamping part 40, 50 is inserted. A screw nut 44, which engages the thread 26, tenses the clamping part 40, 50, the fastening part 10, and a support disk 28 to the shoulder 22 of the drive shaft 12. The fastening part 10 can be made of die casting. Expediently, however, it is shaped from sheet metal, and the indentation 38 is deep-drawn.

Figure 7:
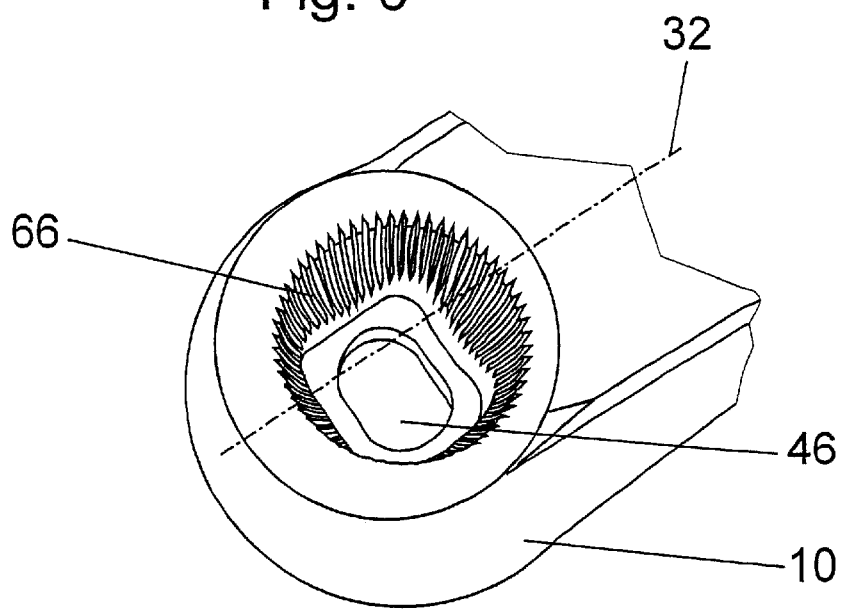
FIG. 7, a fragmentary perspective view of a fastening part seen from above.
Figure 8:
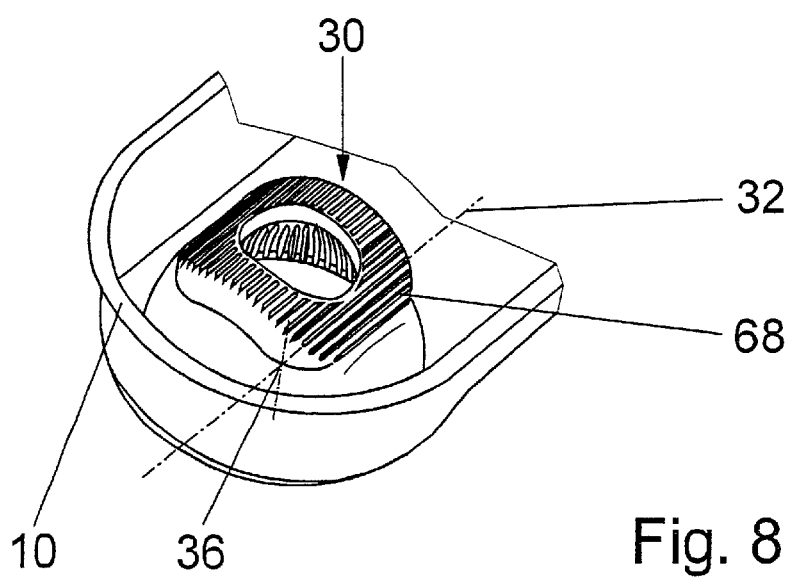
FIG. 8, a fragmentary perspective view of a fastening part seen from below.

The cylindrical bearing face 30 on the fastening part 10 (FIG. 8) is oriented such that its cylinder axis 32 extends in the longitudinal direction 34 of the wiper arm. Furthermore, the contact face 66 (FIG. 7) of the indentation 38 of the fastening part 10 and the surface of the clamping part 40, 50 form part of a sphere, whose center point 36 is located on the cylinder axis 32. It is thus possible, before the tensing by the screw nut 44, to rotate the fastening part 10 about the drive shaft 12 and thus to set the wiper arm to its parking position.

Figure 9:
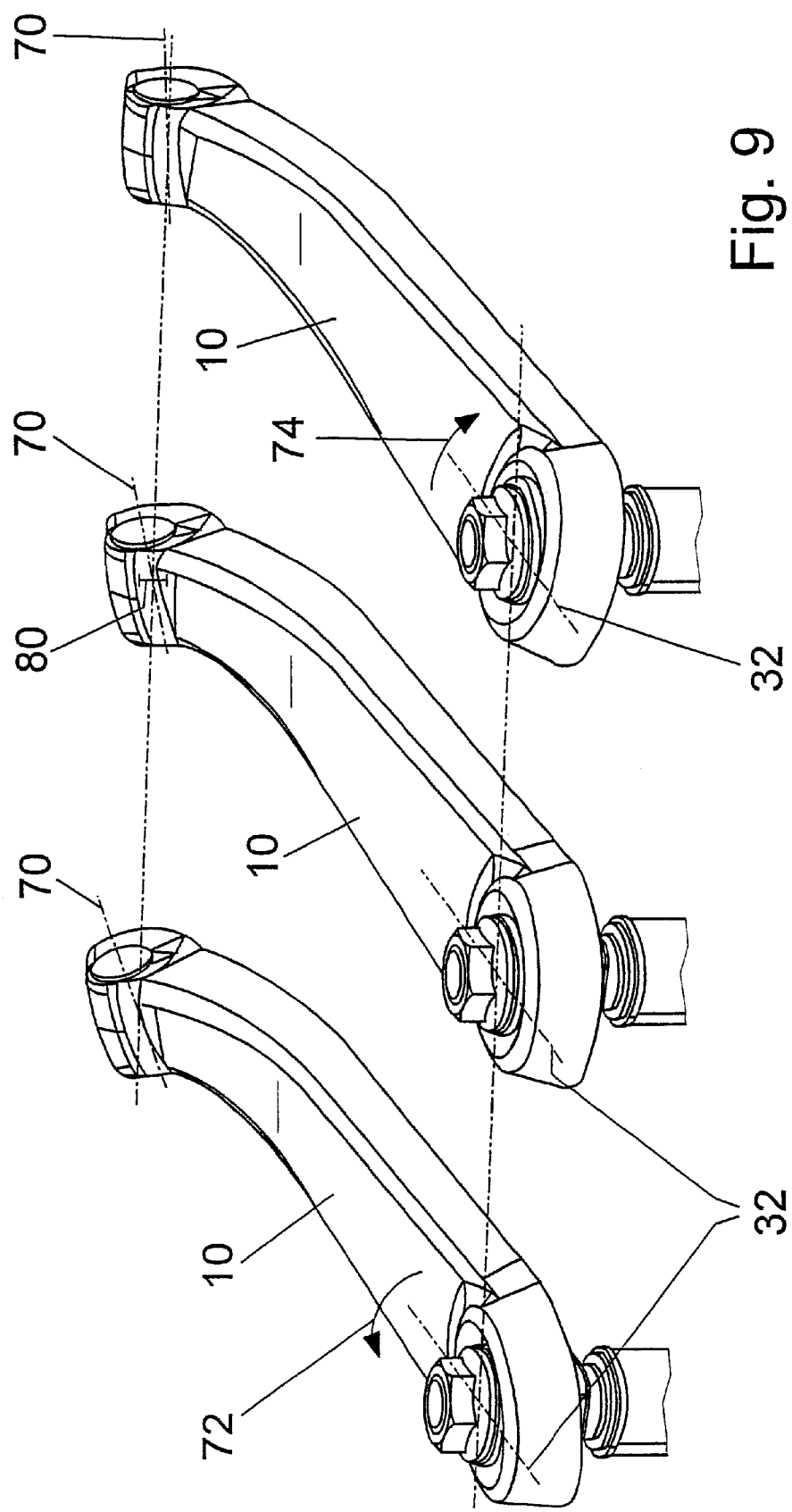
FIG. 9, a fastening part in three various settings.

The fastening part 10 can also be pivoted about the cylinder axis 32. FIG. 9 shows that beginning at a middle position, the fastening part 10 can be adjusted by a limited amount in opposed adjusting directions 72 and 74. In this respect it is expedient that the cylinder axis 32 and thus the center point 36 of the sphere are located in the fastening region 78 of the fastening part. To limit the adjustment, the hole 46 in the fastening part 10 is elongated transversely to the cylinder axis 32, so that it forms a stop on the drive shaft 12 in both adjusting directions 72, 74.

A hinge part, not shown, is pivotably connected to the free end of the fastening part 10, and the hinge axis is marked 70. The cylinder axis 32 preferably intersects the hinge axis 70; in any case, the spacing 80 between the cylinder axis 32 and the hinge axis 70 should be selected to be as slight as possible, so that upon the adjustment of the fastening part 10, only slight deviations in height between the vehicle window and the hinge result. As can be seen from FIG. 9, despite a variable setting angle a (FIG. 4), the middle position in terms of height of the hinge axis 70 does not change.

Figure 6:
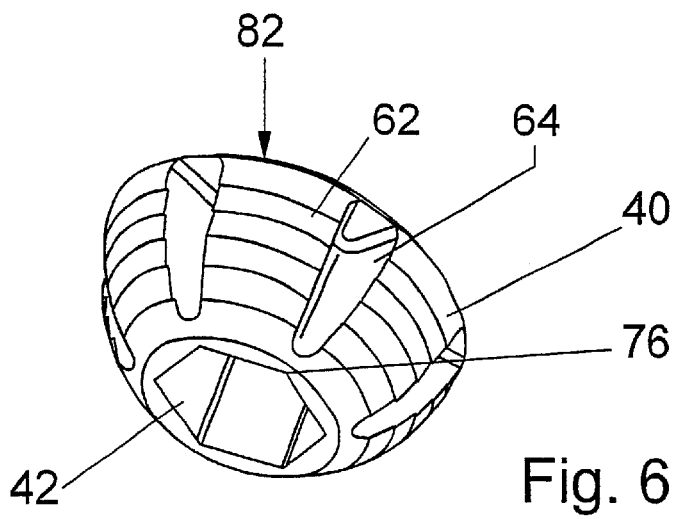
FIG. 6, a clamping part seen in perspective.

The clamping part 40, 50 has an inner slaving profile 42, 54, which fits the outer profile 24, 52 of the drive shaft 12 and transmits the driving moment by positive engagement from the drive shaft 12 to the clamping part 40, 50. Expediently, it has a cross section deviating from the circular, preferably a polygonal cross section. For easier assembly and disassembly and also to achieve freedom from play, the profiles 54 and 52 taper conically toward the end of the drive shaft 12. Because of the positive connection between the clamping part 40, 50 and the drive shaft 12, high torques can be securely transmitted over a small diameter, while the markedly greater diameter of the outer circumference of the clamping part 40, 50 is suitable for transmitting the driving moment to the fastening part 10 by nonpositive engagement. To make it possible to transmit greater driving moments, it is expedient to improve the nonpositive engagement between the clamping part 40 and the fastening part 10 by means of a roughened surface or by means of a fluting 68. It is advantageous if the fluting 68 on the fastening part 10 extends transversely to a possible fluting or surface structure of the clamping part 40. For instance, the clamping part 40 can have steps 62 on its circumference (FIG. 6), which dig into the fluting 68, extending in the direction of the drive shaft 12, of the fastening part 10 in the tensing process and thus produce a secure hold. By this provision, production variations can also be compensated for.

Because the cylinder axis 32 of the cylindrical bearing face 30 of the support disk 28 extends radially to the drive shaft 12, no driving moments that could unintentionally change the setting during operation act in the adjusting direction 72, 74. The bearing faces 30 on both the support disk 28 and the fastening part 10 can be embodied as smooth, in order to achieve an infinitely graduated adjustment. With a fluting 68 in the direction of the cylinder axis 32, it is possible to vary the setting angle a incrementally.

To allow the clamping part 40, 50 to adapt well to the indentation 38, the clamping part 40 on its circumference has grooves 64 extending in the longitudinal direction, as a result of which the clamping part 40 is more-elastic in the circumferential direction. For the sake of a continuously smooth end face 82, it is expedient that the grooves 64 end shortly before the end face 82. In combination with a polygonal slaving profile 42, 54, it is expedient to provide the grooves 64 opposite the edges 76 of the slaving profile 42, as a result of which provision greater elasticity is attained.

Figure 1:
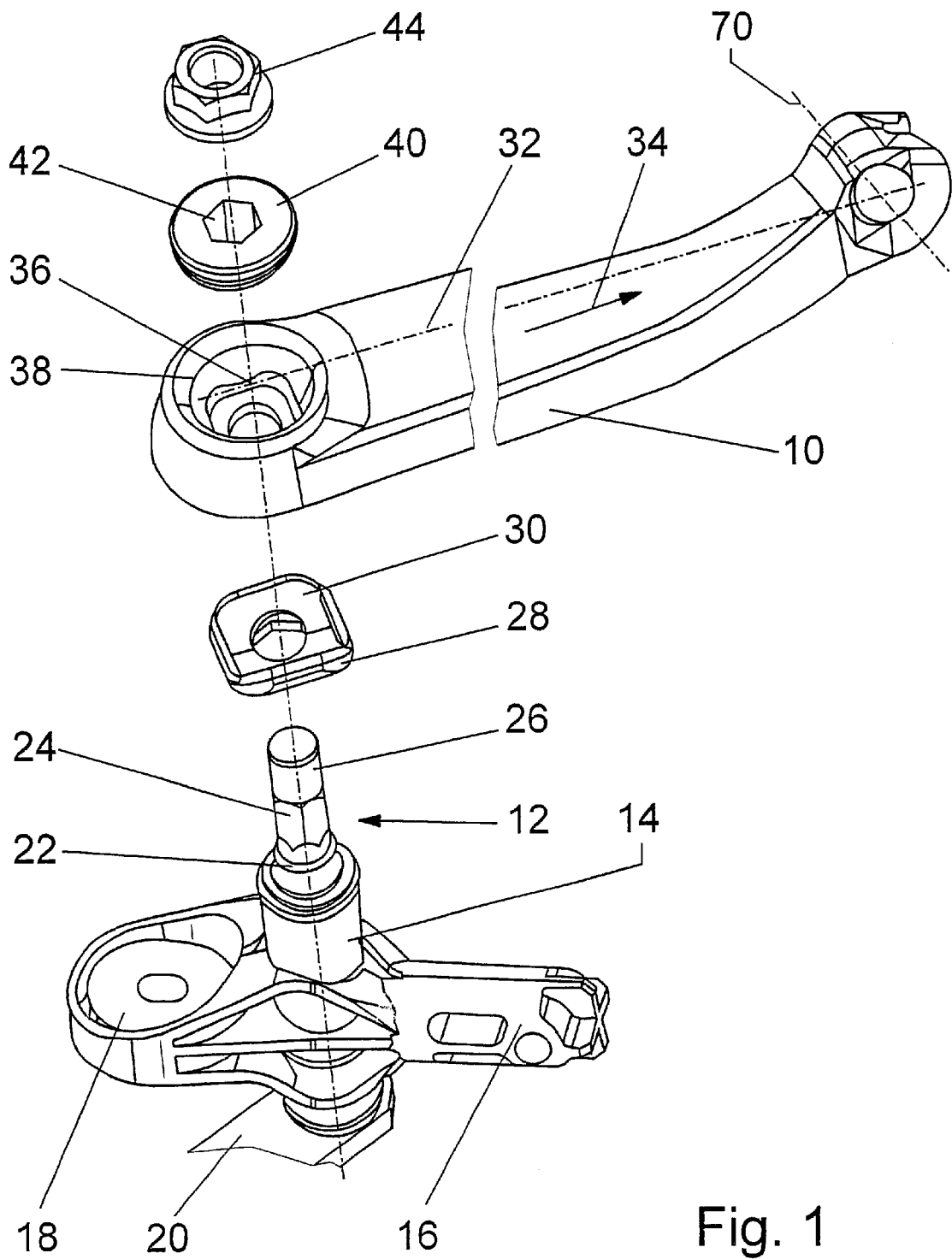
FIG. 1, in an exploded view, a fastening part of a wiper arm according to the invention and a wiper bearing.
Figure 2:
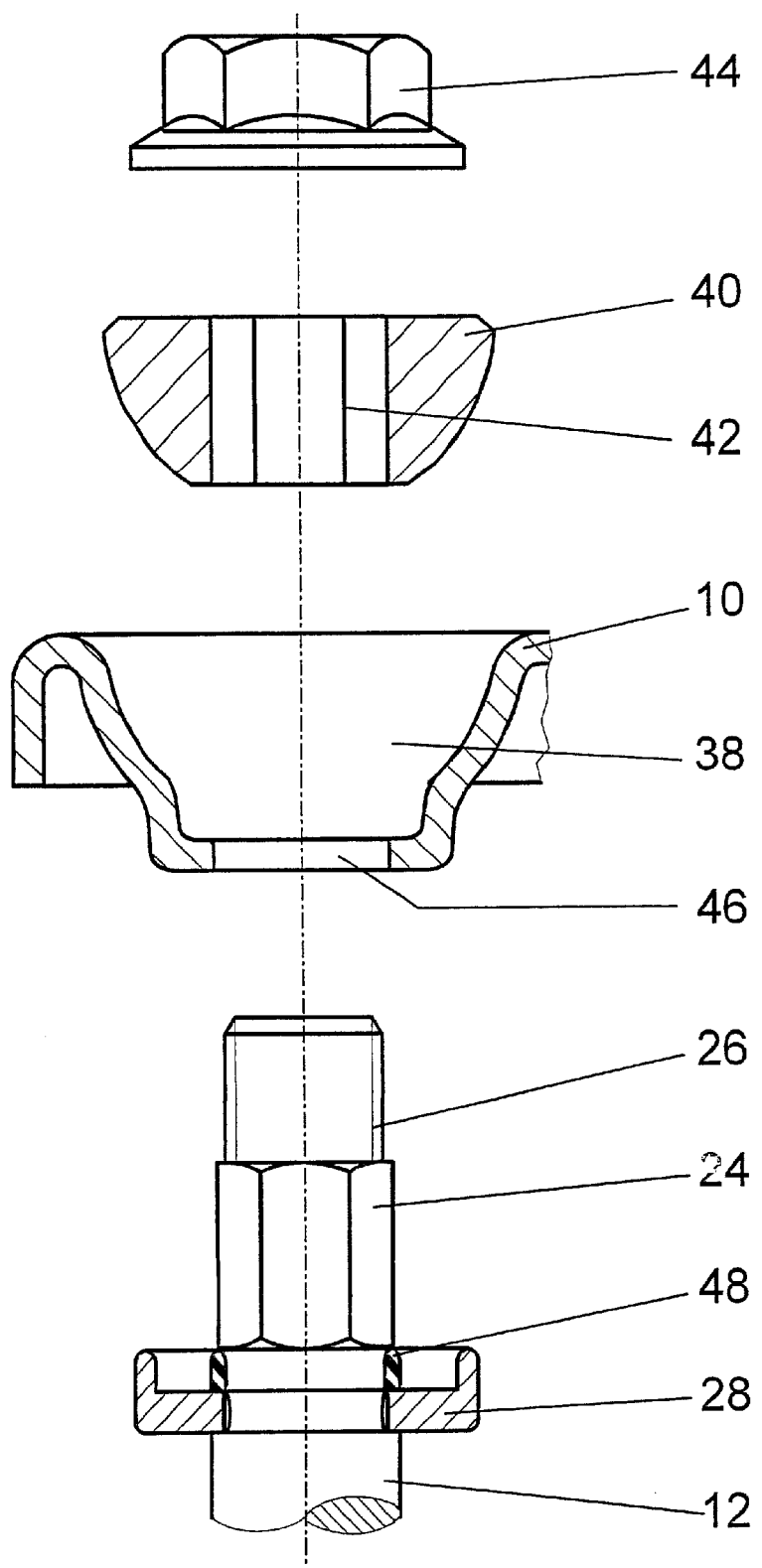
FIG. 2, a fragmentary longitudinal section through a variant on a larger scale and in an exploded view.
Figure 3:
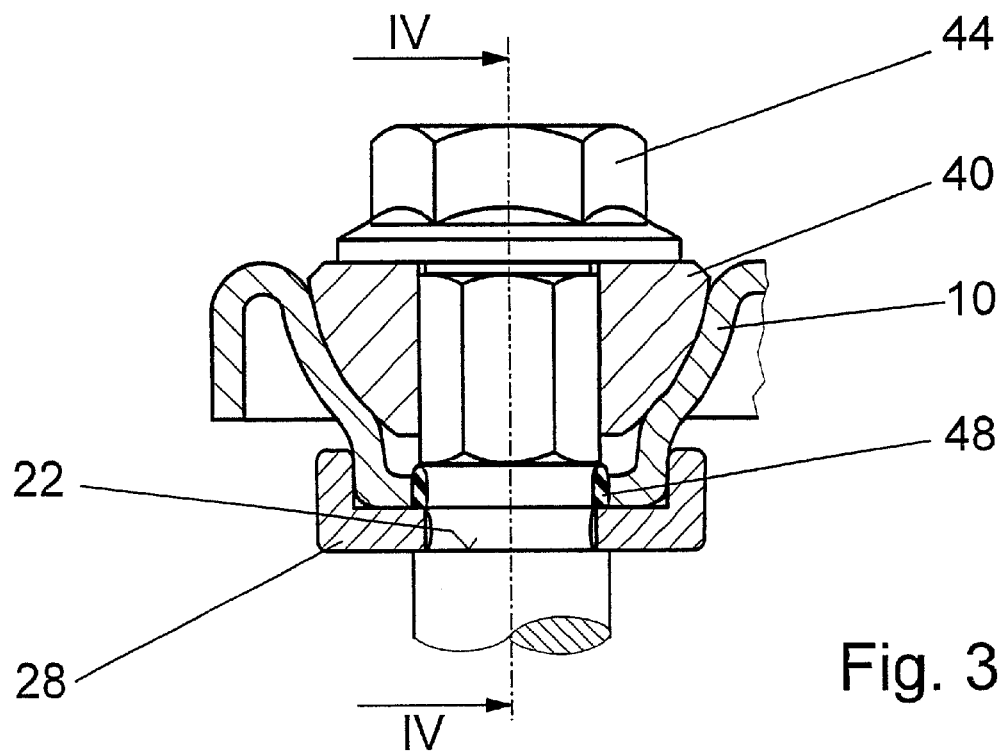
FIG. 3, the version of FIG. 2 in the put-together state.
Figure 5:
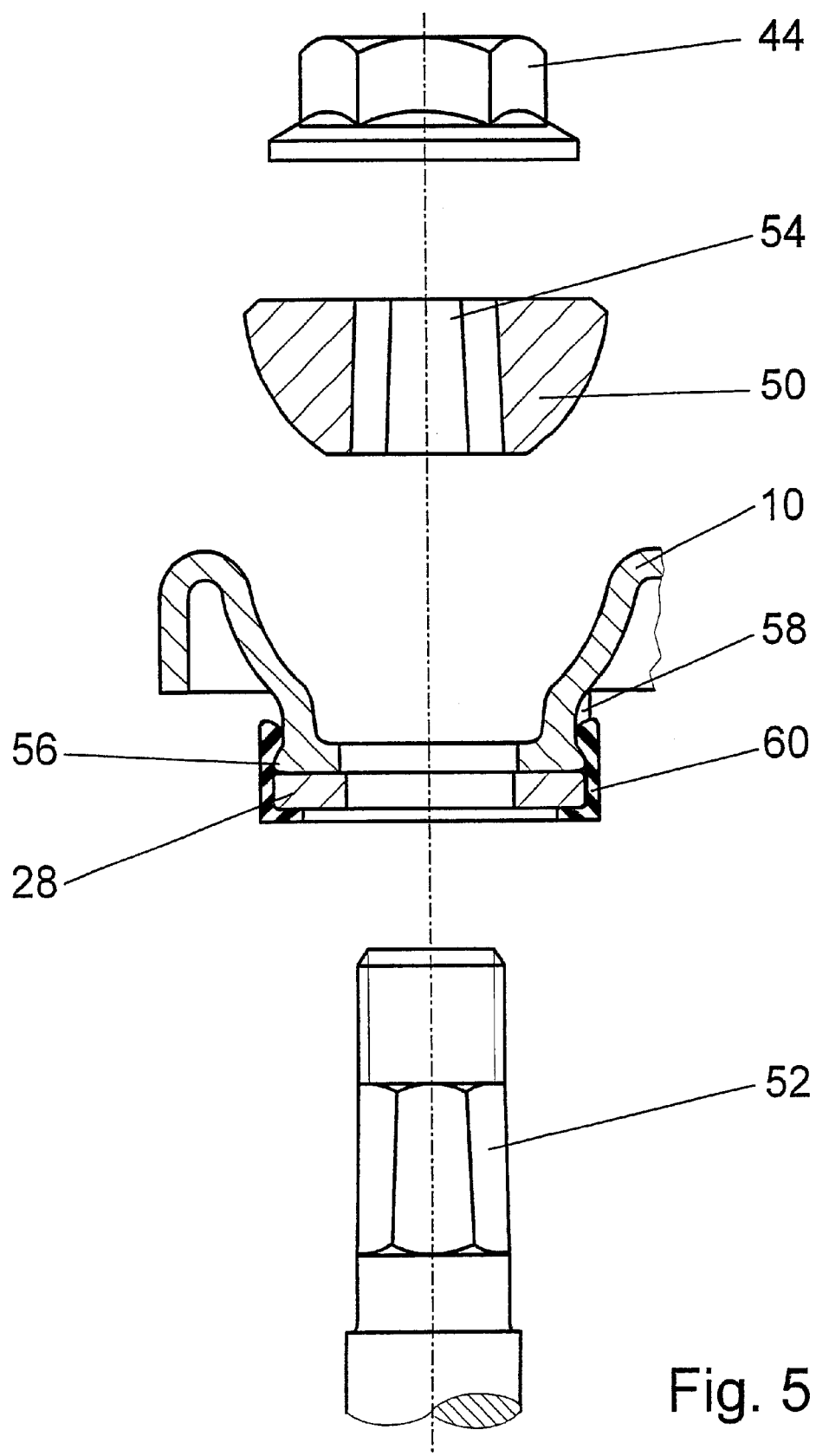
FIG. 5, a variant of FIG. 2.

The mounting of the fastening part 10 can be made easier if the support disk 28, before assembly, is connected to some other component. This purpose is served by a securing ring 48 (FIG. 2), which holds the support disk 28 on the drive shaft 12. One other possibility is illustrated in FIG. 5; in the left half of this drawing, a plastic clip 60 engages behind a collar 56 of the fastening part 10, or as shown on the right side of the drawing, a plastic clip snaps into a corresponding recess 58. The collar 56 and the recess 58 must be disposed and designed in such a way that they do not hinder the adjustment of the fastening part 10 about the cylinder axis 32.

What is claimed is:

1. A wiper arm with a pivotably connected wiper blade and having a fastening part (10) for fastening to a drive shaft (12), by inserting the drive shaft through a widening indentation (38) of the fastening part (10), and a screw nut (44) tenses the fastening part (10) against a bearing face (30) to the drive shaft (12) via a clamping part (40, 50) that is adapted to the indentation (38), characterized in that a contact face (66) between the clamping part (40, 50) and the fastening part (10) forms a partial surface of a sphere, and the bearing face (30) forms a partial jacket face of a cylinder, whose cylinder axis (32) extends through a center point (36) of the sphere and parallel to the longitudinal direction (34) of the wiper blade.

2. The wiper arm of claim 1, characterized in that the cylindrical bearing face (30) is shaped into a support disk (28), which is braced on a shoulder (22) of the drive shaft (12) and is rotatable about the drive shaft (12).

3. The wiper arm of claim 2, characterized in that the support disk (28) is rotatably fastened to the drive shaft (12) by a securing ring (48) of plastic.

4. The wiper arm of claim 2, characterized in that the support disk (28) is fastened to the fastening part (10) pivotably about the cylinder axis (32).

5. The wiper arm of claim 4, characterized in that the support disk (28) is fastened to the fastening part (10) by means of a plastic clip (60).

6. The wiper arm of claim 5, characterized in that the fastening part (10) has a collar (56), on which the plastic clip (60) is retained.

7. The wiper arm of claim 5, characterized in that the fastening part (10) has recesses (58), into which the plastic clip (60) snaps.

8. The wiper arm of claim 2, characterized in that the cylindrical bearing face (30) of an element selected from the group consisting of the fastening part (10) and the support disk (28) has a fluting (68) extending parallel to the cylinder axis (32).

9. The wiper arm of claim 1, characterized in that a setting angle (α) of the fastening part (10) about a cylinder axis (32) is limited by a stop.

10. The wiper arm of claim 9, characterized in that the stop is formed by a hole (46) that is elongated in an adjusting direction (72, 74) in the fastening part (10) to the drive shaft (12).

11. The wiper arm of claim 1, characterized in that the cylinder axis (32) extends inside a fastening region (78) of the fastening part (10).

12. The wiper arm of claim 1, characterized in that a hinge part is pivotably connected to the fastening part (10), and the cylinder axis (32) extends at a slight spacing (80) from a hinge axis (70).

13. The wiper arm of claim 1, characterized in that the fastening part (10) is shaped from sheet metal, and the indentation (38) is deep-drawn.

14. The wiper arm of claim 1, characterized in that the fastening part (10) and the clamping part (50) are structured in a way selected from the group consisting of roughened on the spherical contact face (66) and fluted so that the fluting of the fastening part (10) intersects the fluting of the clamping part (50).

15. The wiper arm of claim 1, characterized in that the clamping part (40, 50) has annular steps (62) on its circumference.

16. The wiper arm of claim 1, characterized in that the clamping part (40, 50) is joined to the drive shaft (12) via a profile (24, 52), which in cross section deviates from the circular shape.

17. The wiper arm of claim 16, characterized in that the profile (24, 52) has a polygonal cross section.

18. The wiper arm of claim 17, characterized in that the grooves (64) are located opposite the edges (76) of the polygonal profile (24, 52).

19. The wiper arm of claim 17, characterized in that the polygonal profile (52) of the drive shaft (12) narrows toward the screw nut (44).

20. The wiper arm of claim 1, characterized in that the clamping part (40) has longitudinally extending grooves (64) on its circumference.

21. The wiper arm of claim 20, characterized in that the grooves (64) end shortly before the larger end face (82).

* * * * *